United States Patent
Hoffman

(10) Patent No.: US 10,060,809 B1
(45) Date of Patent: Aug. 28, 2018

(54) FRICTION STABILIZER PULL TESTER AND METHOD

(71) Applicant: Larry C. Hoffman, Butte, MT (US)

(72) Inventor: Larry C. Hoffman, Butte, MT (US)

( * ) Notice: Subject to any disclaimer, the term of this patent is extended or adjusted under 35 U.S.C. 154(b) by 0 days.

(21) Appl. No.: 15/696,899

(22) Filed: Sep. 6, 2017

Related U.S. Application Data

(60) Provisional application No. 62/413,646, filed on Oct. 27, 2016.

(51) Int. Cl.
*E21D 21/00* (2006.01)
*E21D 20/02* (2006.01)
*G01L 5/00* (2006.01)
*F16B 13/14* (2006.01)

(52) U.S. Cl.
CPC .......... *G01L 5/0033* (2013.01); *E21D 21/004* (2013.01); *F16B 13/143* (2013.01)

(58) Field of Classification Search
CPC ................ E21D 21/00; E21D 21/0026; E21D 2021/0073; E21D 21/008; E21D 20/02; E21D 20/023
USPC ....... 405/259.1–259.6; 411/55, 8, 63–65, 70, 411/71, 15; 73/151, 784, 84, 845, 841
See application file for complete search history.

(56) References Cited

U.S. PATENT DOCUMENTS

| | | | | |
|---|---|---|---|---|
| 658,118 A | * | 9/1900 | Parsons | G01L 5/06 73/862.42 |
| 1,186,174 A | * | 6/1916 | Eloesser | G01L 5/06 73/862.42 |
| 2,235,279 A | * | 3/1941 | Bunker | E21B 47/0006 116/291 |
| 2,245,188 A | * | 6/1941 | Earle | H01H 85/36 337/240 |
| 2,656,699 A | * | 10/1953 | Chapin | D06F 23/04 318/160 |
| 3,017,799 A | * | 1/1962 | Lemoine | E21D 21/00 405/259.3 |
| 3,110,177 A | * | 11/1963 | Merrill | B66F 3/242 73/862.42 |
| 3,133,468 A | | 5/1964 | Cummings | |
| 3,179,082 A | * | 4/1965 | McClean | E21D 21/02 116/212 |
| 3,204,416 A | * | 9/1965 | Williams | E21D 20/021 405/259.3 |
| 3,226,934 A | | 1/1966 | Emery | |

(Continued)

OTHER PUBLICATIONS

How Split set Rock Bolt and Friction Bolts Work, http://www.splitset.com/rock-bolts.html Pub2003 (captured 2016).

(Continued)

*Primary Examiner* — Benjamin F Fiorello
*Assistant Examiner* — Edwin J Toledo-Duran

(57) ABSTRACT

Friction stabilizer pull tester apparatus and method for testing friction stabilizer type rock bolts including a pull tester toolhead comprising a tension rod with a radially expanding collet device inserted and expanded in a friction stabilizer steel tube. A confining collar on the tension rod for restricting longitudinal movement of the expanding device and outward deformation of the friction stabilizer tube at a friction stabilizer ring flange. A pre-tensioning device applies an initial force to seat apparatus and a pulling apparatus applies a greater load force to the tension rod to determine load capacity of the friction stabilizer.

20 Claims, 7 Drawing Sheets

(56) References Cited

U.S. PATENT DOCUMENTS

| | | | | |
|---|---|---|---|---|
| 3,316,797 A * | 5/1967 | Williams | ............... | E21D 20/021 405/259.3 |
| 3,403,552 A * | 10/1968 | Erisman | ................... | G01L 5/08 474/110 |
| 3,559,470 A * | 2/1971 | McDowell | ............... | G01L 5/06 73/828 |
| 3,693,359 A * | 9/1972 | Karara | ................. | E21D 21/008 405/259.3 |
| 3,695,045 A * | 10/1972 | Williams | ............... | E21D 20/00 405/259.5 |
| 3,791,206 A * | 2/1974 | Grasman | ................... | G01L 5/04 73/862.041 |
| 3,837,258 A * | 9/1974 | Williams | ............... | E21D 20/00 405/259.3 |
| RE28,227 E * | 11/1974 | Elders | ................... | E21D 20/003 405/259.1 |
| 3,922,867 A | 12/1975 | Scott | | |
| 3,942,368 A * | 3/1976 | Hoyt | ................... | G01L 5/0033 73/784 |
| 4,000,681 A | 1/1977 | Coldren | | |
| 4,030,345 A * | 6/1977 | Edmond | ................. | E02D 1/022 73/784 |
| 4,152,929 A | 5/1979 | Edmond et al. | | |
| 4,183,699 A * | 1/1980 | Donan, Jr. | ......... | E21D 21/0086 277/640 |
| 4,242,915 A | 1/1981 | Herman, III | | |
| 4,315,708 A * | 2/1982 | Liebig | ................ | F16B 13/0833 411/341 |
| 4,369,003 A * | 1/1983 | Brandstetter | ......... | E21D 21/008 405/259.3 |
| 4,485,677 A * | 12/1984 | Amelot | ................ | E04G 21/121 73/761 |
| 4,542,655 A | 9/1985 | Park et al. | | |
| 4,557,147 A * | 12/1985 | Rohde | ..................... | G01N 3/24 73/784 |
| 4,765,778 A * | 8/1988 | Valentine | ............... | E21D 20/02 405/259.5 |
| 4,773,259 A * | 9/1988 | Handy | ................... | E02D 1/022 73/784 |
| 4,784,530 A * | 11/1988 | Price, Jr. | ............... | E21D 20/025 405/259.3 |
| 4,974,997 A * | 12/1990 | Sero | .......................... | E02D 5/72 405/231 |
| 4,984,938 A * | 1/1991 | Scott, Jr. | ............. | E21D 21/0093 405/259.1 |
| 5,052,861 A * | 10/1991 | Hipkins, Sr. | ......... | E21D 21/008 405/259.3 |
| 5,112,160 A * | 5/1992 | Jensen | .................. | E21D 21/008 405/259.1 |
| 5,253,960 A * | 10/1993 | Scott | ..................... | E21D 21/006 405/259.1 |
| 5,511,909 A * | 4/1996 | Calandra, Jr. | ............ | E04C 5/122 405/259.1 |
| 5,525,013 A * | 6/1996 | Seegmiller | ............ | E21D 11/006 405/259.3 |
| 5,741,092 A * | 4/1998 | Castle | ................. | E21D 21/0026 405/259.1 |
| 5,791,824 A * | 8/1998 | Radtke | ................ | E21D 21/0026 405/259.1 |
| 5,829,922 A * | 11/1998 | Calandra, Jr. | ......... | E21D 21/008 405/302.2 |
| 5,929,341 A | 7/1999 | Bawden et al. | | |
| 6,813,965 B2 * | 11/2004 | Sailing | .................. | B23B 31/006 409/131 |
| 7,313,975 B1 * | 1/2008 | Scorteanu | ............... | G01L 5/103 254/257 |
| 7,324,007 B2 | 1/2008 | Sunderman et al. | | |
| 7,640,998 B2 * | 1/2010 | Howell, Jr. | ............. | E21B 7/022 173/184 |
| 8,246,280 B2 | 8/2012 | Hangleiter | | |
| 8,714,883 B2 | 5/2014 | Rataj | | |
| 8,882,395 B2 * | 11/2014 | Kim | ......................... | E02D 5/80 405/259.4 |
| 2001/0046418 A1 * | 11/2001 | Lay | ....................... | E21D 20/021 405/259.4 |
| 2004/0136788 A1 * | 7/2004 | Hindle | ................ | E21D 21/0026 405/259.1 |
| 2006/0067795 A1 * | 3/2006 | Spearing | ............... | E21D 11/006 405/259.4 |
| 2006/0093438 A1 * | 5/2006 | Fergusson | ............... | E21D 20/02 405/259.3 |
| 2009/0074516 A1 * | 3/2009 | Craig | .................. | E21D 21/0033 405/259.1 |
| 2009/0317197 A1 * | 12/2009 | Hinton | .................. | E21D 21/008 405/302.2 |
| 2012/0114426 A1 * | 5/2012 | Kenny | .................. | E21D 21/008 405/259.4 |
| 2014/0072372 A1 * | 3/2014 | Vosbikian | ........... | E21D 21/0086 405/259.1 |
| 2015/0354354 A1 * | 12/2015 | Vahlstrom | ............... | E21D 20/00 405/259.4 |
| 2016/0025608 A1 | 1/2016 | Darlington et al. | | |

OTHER PUBLICATIONS

Martin et al., Design and Testing of a Nondestructive Friction Bolt Tester, IC9469, p. 2-5, 2004, NIOSH, USA.

Nicholson, Analysis and Interpretation of In Situ Rock Bolt Pull Tests in Hard Rock Mines, Thesis, University of Toronto, 2016.

Phoenix Split Set Mining Systems, http://www.splitset.com.au/index.php?option=com_content&task=view&id=26&Itemid=83, Pub. 2008.

PHQ STFB20T Friction Bolt Pull Tester, www.phqglobal.com/assets/images/parts/rockbolts/Puller%20instruction.pdf, date unknown.

DYWIDAG-Systems International, Mining and Tunneling Products Catalogue, Section 2, p. 26 and Section 4, Aug. 2017.

Strasil, Jr., BP0150 Making a Collet Chuck—100 Series—I Forge Iron, https://www.iforgeiron.com/index2.html/blueprints/100-series/bp0150-making-a-collet-chuck-r382/, Mar. 23, 2007.

Tomroy et al., Factors Influencing the Effectiveness of Split Set Friction Stabilizer Bolts, https://rocscience.com/documents/pdfs/uploads/9157.pdf, p. 3-36, Mar. 1998.

Form_16515_ASS_33, 39, 46, Split Set® friction rock stabilizers, International Rollforms, Inc., http://www.splitset.com/, Model SS-33, Model SS-39, Model SS-46, Pub. 2010.

* cited by examiner

US 10,060,809 B1

FRICTION STABILIZER PULL TESTER AND METHOD

CROSS-REFERENCE TO RELATED APPLICATION

This application claims the benefit of U.S. Provisional Application No. 62/413,646, filed Oct. 27, 2016.

FIELD OF THE INVENTION

A pull tester apparatus and method for determining the load carrying capacity of an installed friction stabilizer type rock bolt. The apparatus including a pull tester toolhead comprising an internal expanding device for inserting into a friction stabilizer where the internal expanding device is restrained in a longitudinal direction and the friction stabilizer is restrained in a radial direction allowing for high pull testing forces on the friction stabilizer.

BACKGROUND OF THE INVENTION

Rock bolts are used for support in a variety of mining and civil engineering situations. The term 'rock bolt' loosely encompasses mechanical anchors, grouted anchors and friction bolts. The term 'rock bolt' also specifically refers to mechanical ground anchors that include threaded bolts. However, ground anchors and ground stabilizers, while often called 'rock bolts' may not include a bolt at all. One example is a friction stabilizer. Friction stabilizers are manufactured by a number of companies, one of which is International Rollforms, Inc. previously Ingersoll-Rand Inc., which produces a friction stabilizer under the registered trademark, "Split Set."

A Split Set® friction stabilizer comprises a high strength, rolled steel, split tube having a tapered distal end to facilitate insertion into a drilled-out borehole and a steel ring welded adjacent to an opposite proximal end for withstanding an insertion force and for retaining a steel faceplate, see FIG. 3. A friction stabilizer is installed by pushing the split tube into a slightly undersized borehole where compression of the split tube creates a radial outward spring force onto the borehole wall, and thereby provides frictional anchorage along the length of the split tube and borehole for resisting pull out forces.

Friction stabilizers are quick and simple to install and are thus widely used by miners around the world. A rock drill typically bores a hole and impact drives the friction stabilizer into the borehole with only a quick change of work bit.

Friction stabilizers are used in a wide variety of environments, especially in tunnels and underground mines, coal to hard rock. They are often used with mesh, for example chain link fence or welded wire fabric (WWF), where a friction stabilizer faceplate holds the mesh against a rock surface, thereby catching broken rock between friction stabilizers. This is particularly useful for tunnels and mines walls and ceilings or roofs.

Corrosion can be a problem with friction stabilizers since its steel is relatively thin and in direct contact with the borehole material. Some environments are more corrosive than others, for instance coal sulfides or rock mineral deposits may contact the steel tube, or moist or alkaline salt air might enter the tube. Galvanizing friction stabilizers may help to reduce corrosion but adds to the cost and may not last for long term applications in aggressive environments.

Testing the load capacity of installed friction stabilizers is an important workplace safety measure. Earth or rock changes and corrosion can negatively affect the load carrying capacity of a friction stabilizer, often with adverse conditions hidden from sight through the depth of the borehole. Nondestructive testing methods are essential so that new and old friction stabilizers can be tested without removing or destroying the original or current load capacity.

One nondestructive method of testing is to install strain gauges on a friction stabilizer that measure movement. This type of testing involves delicate equipment in harsh mining environments, is expensive, and not practical for testing a multitude of friction stabilizer.

Another method for nondestructive testing of a friction stabilizer is to pre-install a spacer and collar on select friction stabilizers for sampling conditions. Here, the spacer and collar slide onto a split tube followed by the friction stabilizer faceplate, all of which are retained by the split tube ring flange and installed in and against the rock. For testing, a U-shaped claw is slid onto the exposed spacer and a pulling force is applied to the claw drawing down on the collar. This method requires foresight as to which friction stabilizers will be tested in the future. Moreover, mines typically use thousands of friction stabilizers, so adding a spacer and collar to each friction stabilizer is cost prohibitive, increases an inventory of parts, produces a dangerous stub protruding from a mine wall or ceiling, and shortens the insertion length of the split tube thereby decreasing load carrying capacity of the friction stabilizer. Plus, friction stabilizers have been used since about 1975, while spacers and collars were introduced long after that. Thus, older installed friction stabilizers can not be tested with this method.

Another method for nondestructive testing of an existing friction stabilizer is to attach an exterior collar and then pull on the collar. In this method, the collar has a lip which is fitted in between a friction stabilizer ring and faceplate. Unfortunately, installing the exterior collar is problematic, since rarely is there sufficient space between the friction stabilizer ring and faceplate for the collar's lip. This is particularly true when the friction stabilizer split tube is anything but ninety degrees to the faceplate, which in practice, is more often the case than not. The present FIG. 1, illustrates a ring flange 53 abutting faceplate 60 on the left side of friction stabilizer 50. When the exterior collar lip is insufficiently purchased in between a ring flange and faceplate, the collar pulls off during testing resulting in lost time, a falling equipment hazard and a failed test. Experience has shown that in use, the exterior collar testing method is slow to install, requires multiple tools, and often fails.

What is needed is a friction stabilizer pull tester apparatus capable of efficiently testing each friction stabilizer, regardless of orientation, regardless of the existence of a pre-installed collar, and regardless of age. Miners, mine operators and tunnel inspectors want more than a pull test sampling, they want to know if they are safe throughout a worksite. Furthermore, by nondestructive testing a multitude friction stabilizers, rock change patterns may be detected and thus routinely monitored for safety.

BRIEF SUMMARY OF THE INVENTION

The present friction stabilizer pull tester apparatus and method is provided for efficient, nondestructive testing load capacity of friction stabilizers. The inventive device was developed to meet safety objectives of Mine Safety and Health Administration (MSHA), Federal Code of Regulations (30 CFR), and the American Society for Testing of Materials (ASTM) standards. The present pull tester apparatus provides proper test results regardless of friction stabilizer orientation, does not require a pre-installed testing collar and works well regardless of friction stabilizer age. The apparatus is relatively compact and portable, and one test can be safely completed in two to three minutes. The present inventor has thus provided an apparatus and method for fast and quality testing of friction stabilizer throughout a mine, tunnel or other installation, thus insuring worksite and worker safety.

The present friction stabilizer pull tester apparatus includes an inventive pull tester toolhead, comprising an internal expanding device or collet that grips an inside surface of a friction stabilizer, and an outside confining device or collar that restricts longitudinal movement of the internal expanding device, and restricts radial expansion of the friction stabilizer at the ring flange. A tension rod, extending from or through the expanding internal device and through the confining device, allows for attachment of a tensioning device and a measuring device.

Using an expanding internal device for pull testing a friction stabilizer is counter-intuitive since a radially outward force, seven to eight times the longitudinal force due to a wedging action, on the inside surface of a friction stabilizer would seemingly deform the friction stabilizer outward causing the friction stabilizer split tube to bind against the borehole wall or faceplate producing a false pull test reading. Moreover, friction stabilizers are typically made from rolled steel biased radially outward, so using an expanding internal device would seemingly accentuate this bias producing a false reading or split tube failure.

The present inventor has discovered that internal radial force, used in conjunction with an external confining force, sufficiently contains outward forces on the friction stabilizer allowing for high longitudinal tension forces to be applied. The present inventor has also discovered that providing a confining device positions the internal expanding device gripping surface in a desirable location at or near the friction stabilizer ring flange, preferably spanning the ring flange longitudinally, thereby achieving the desired pulling capacity surprisingly without detrimental distortions of the friction stabilizer.

In a preferred embodiment an inventive pull tester toolhead is attached to a friction stabilizer by inserting an expanding internal collet inside a friction stabilizer until a confining collar abuts the ring flange of a friction stabilizer, generally confining the outside radius of the friction stabilizer ring flange in a longitudinal direction and radial direction. A pre-tensioning fastener tightened along the tension rod compresses the internal collet firmly against the split tube and the confining collar, which then holds the pull tester toolhead tightly in place while remaining pulling fixtures are attached to the tension rod. The pull tester toolhead is relatively lightweight so it is easily transported to various friction stabilizers, even those located overhead, and when it is attached to a friction stabilizer under force from the pre-tensioner it is secure enough for safe installation of a heavier pulling apparatus, such a hydraulics cylinder and piston.

The inventive pull tester toolhead is preferably used with a stand-off device having adjustment compensating for the friction stabilizer's orientation. The stand-off device adjustment may include adjustable legs that engage the faceplate or rock surface to provide an opposing force as a tension force is applied. During testing, the faceplate can be restrained from movement by the stand-off device so the friction stabilizer split tube is free to travel through the faceplate orifice should the split tube start to pull-out of a borehole during testing.

The pull tester toolhead internal expanding device is preferably an expanding collet generally cylindrical on the outside, comprised of longitudinal segments having an interior taper. The segments fit around a complementary tapered wedge plug that pushes the segmented pieces outward when longitudinal force is applied to the wedge plug via the tension rod. Segmenting the collet allows the wedge plug to precede the expanding collet upon insertion into a friction stabilizer and permits appreciable directly outward radial expansion thereof.

The expanding collet has a bite portion which increases grip on the interior surface of the friction stabilizer. The bite portion may include a step, a ridge(s), thread ridges, a knurled surface, or the like which engages the split tube. The bite portion may result in a slight expansion or swage in the split tube at or near the friction stabilizer ring flange, thereby increasing the pull tester toolhead grip on the friction stabilizer split tube. The expanding collet preferably includes one or more channels for receiving a retainer, such as a resilient ring or o-ring, for keeping the expanding collet on the wedge plug and tension rod when the expanding collet is not confined by the friction stabilizer interior. The expanding collet is of sufficient length to abut the confining collar and generally position the ring flange equal longitudinal distance from the collet's ends.

The pull tester toolhead confining collar is designed with internal steps that (a) restrict radial expansion of the friction stabilizer ring flange, generally 360 degrees around the circumference thereof, (b) limit longitudinal travel of the expanding collet with respect to the split tube by a step abutting the ring flange, (c) limit longitudinal travel of the expanding collet inside the friction stabilizer split tube by a step abutting the expanding collet, (d) do not abut or interfere with a proximal end of the friction stabilizer split tube, and (e) does not interfere with travel of the wedge plug. The confining collar also has a surface for a pre-tensioner device to set the pull tester toolhead in place, and has a central hole allowing for free longitudinal travel of the confining collar in an opposite direction from the tension rod.

A preferred method of using a friction stabilizer pull tester apparatus includes inserting an internal expanding device in an installed friction stabilizer, expanding the internal expanding device, thus exerting an outward radial force on a friction stabilizer tube while confining radial displacement of the friction stabilizer tube, and exerting a longitudinal tension force for seating the pull tester apparatus and for attempting to displace the friction stabilizer. Restricting longitudinal movement of the internal expanding device locates an outward radial force that is at a friction stabilizer ring flange. Confining the ring flange from radial outward movement prevents distortion of the friction stabilizer tube and increases grip on the friction stabilizer.

The method may further include minor swaging the friction stabilizer split tube proximate the ring flange, such as, by providing a step, protrusion or thread ridges on an exterior surface of an internal collet. The swaging step increasing the grip, bite or frictional contact between a pull tester toolhead and friction stabilizer.

The method further includes firmly seating the internal expanding device and confining device using a pre-tension fastener, such as a nut and stiff compression spring, and thereafter attaching a stand-off device and tensioning device, such as a hydraulic cylinder and piston. The pre-tension function greatly assists in installation because the heavier stand-off device and tensioning device can be attached after the initial pull tester toolhead is secured to a friction stabilizer.

After initially abutting the confining device against the ring flange, radially and longitudinally, and tightening the pre-tension fastener, then further exerting of a pulling force on the tension rod device tests the load capacity of the friction stabilizer. Measuring the pulling force is for calculating and comparing a testing load capacity to a predetermined load capacity. Friction stabilizers have a maximum rated load capacity for each diameter and length. In testing, a hydraulic cylinder and piston applies a tension force to the end of the friction stabilizer via the pull tester toolhead. Fluid pressure applied to the hydraulic cylinder is shown on a pressure gauge as pounds per square inch. Area of the piston in the hydraulic cylinder determines the pulling force applied, and gauge pressure is increased until a pre-determined pulling force is reached or the friction stabilizer slips. In practice, nondestructive testing occurs at a test pulling force less than the maximum predetermined load capacity so as not to induce failure of a perfectly safe friction stabilizer.

These and other features and objects of the invention are set forth in details below and in the drawings in regard to a preferred embodiment.

DETAILED DESCRIPTION OF A PREFERRED EMBODIMENT

Figure 1:
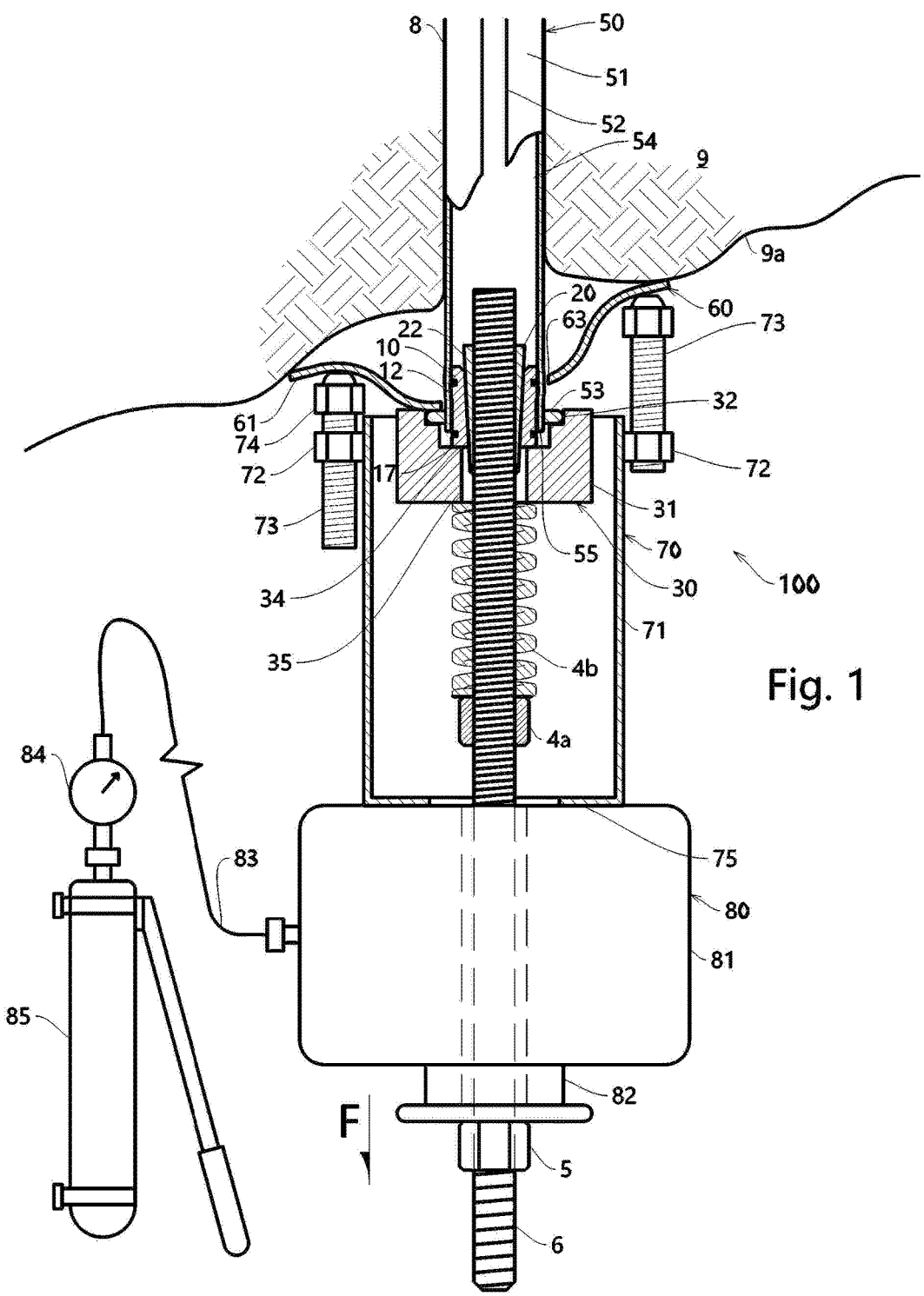
FIG. 1 shows a partial cut-away view of a preferred friction stabilizer pull tester toolhead inserted into a friction stabilizer and stand-off device with plane view of a hydraulic pulling apparatus.
Figure 2:
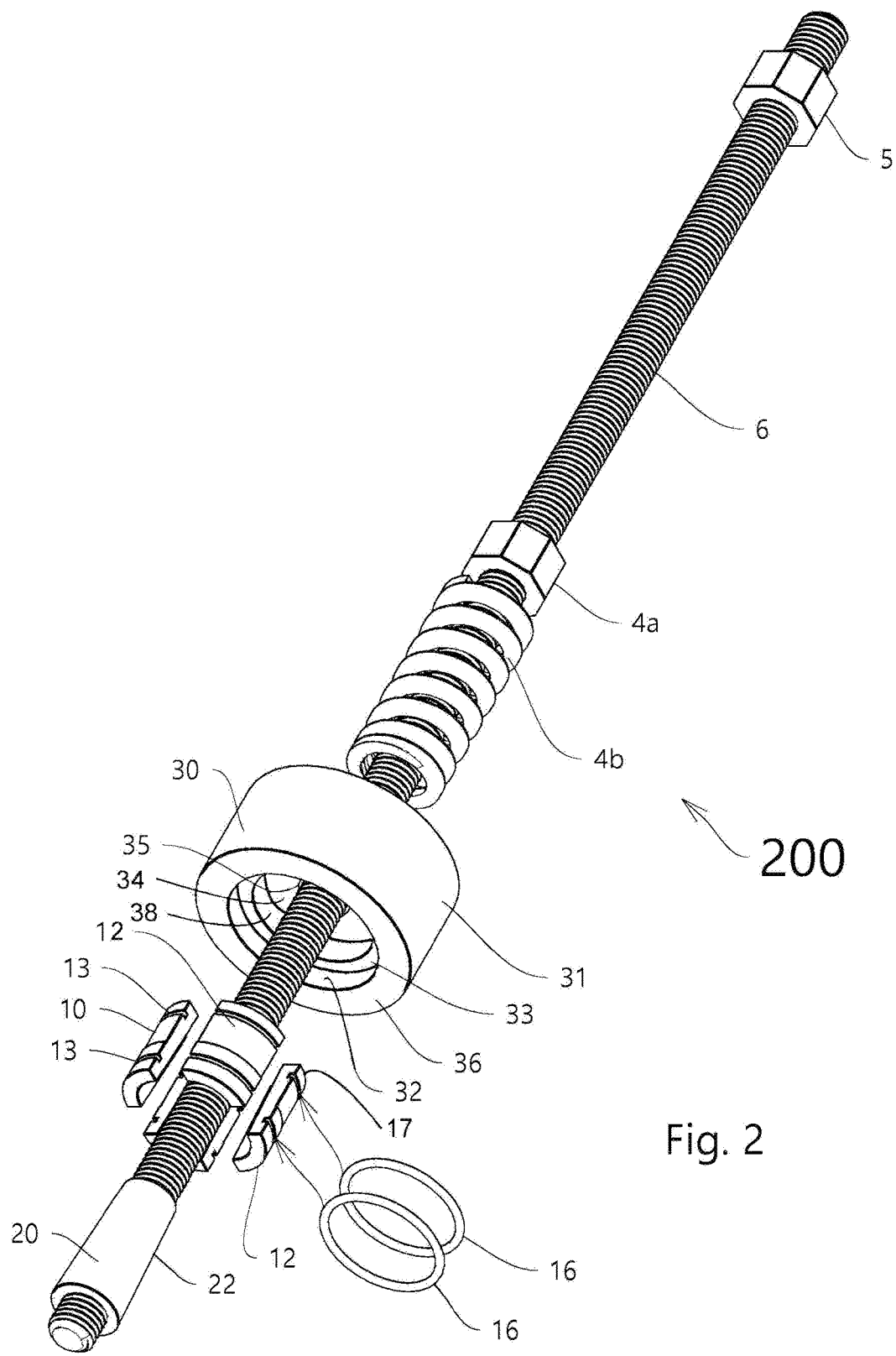
FIG. 2 shows an isometric view of a preferred pull tester toolhead with expanded collet and o-rings therefor.

A friction stabilizer pull tester apparatus 100 is shown in FIG. 1 as comprising a pulling apparatus 80, a stand-off device 70 and a pull tester toolhead 200, see FIG. 2. Friction stabilizer pull tester 100 is used to test the load capacity of a friction stabilizer 50 that is typically impact driven into a borehole 8 in rock 9. Load capacity information gained from the pull tester apparatus is useful for determining appropriate borehole size when first installing friction stabilizers and for determining load strength of existing friction stabilizers, some of which may be over thirty years old.

Figure 3:
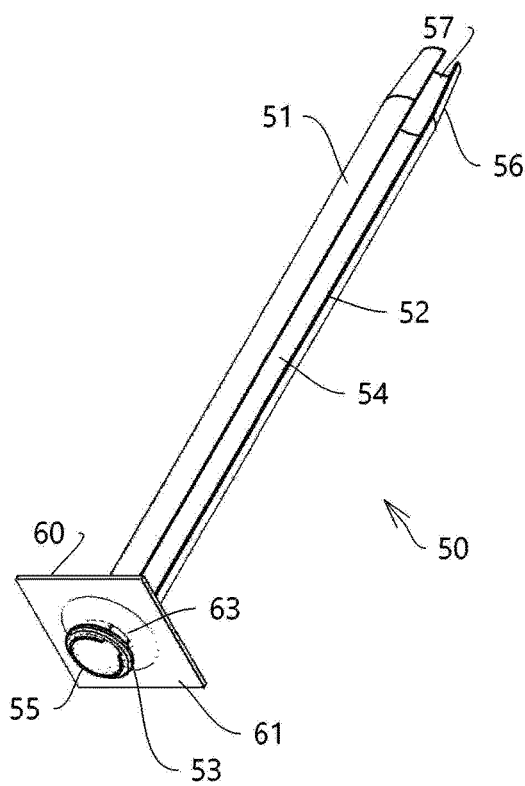
FIG. 3 shows an isometric view of a Split Set® friction stabilizer.

One type of a rock bolt is a friction stabilizer 50 shown in FIG. 3. This particular friction stabilizer 50 is a Split Set®. Here, friction stabilizer 50 includes a steel tube 51 with a lengthwise gap or split 52, an interior surface 54, a taper 56 adjacent a distal end 57 and with a steel ring flange 53 welded adjacent a proximal end 55. A friction stabilizer 50 is installed in a borehole 8 that was drilled to a diameter slightly smaller than the diameter of steel tube 51, which thereby compresses friction stabilizer 50 radially generating forces that result in frictional resistance to pulling out of borehole 8.

Friction stabilizer 50 includes a faceplate 60 that slides onto tube 51 through faceplate orifice 63 prior to split tube 51 being driven into borehole 8 of FIG. 1. Faceplate 60 is restrained by ring flange 53 having a larger diameter than orifice 63 and provides compressive force on exposed rock surface 9*a*. Faceplate 60 can be used to retain mesh (not shown) against rock surface 9*a* for additional protection from falling rock in between friction stabilizers 50. As shown in FIG. 1, faceplate 60 is often at an angle to friction stabilizer tube 51 due to irregularities of rock face 9*a* and the angle of borehole 8.

In FIG. 2, the friction stabilizer pull tester apparatus 100 includes a pull tester toolhead 200 comprising a tension rod 6, expanding device or internal collet 10, wedge plug 20, confining collar 30, fastening device 4*a-b* and additional fastener 5.

Pull tester toolhead 200 grips a section of split tube 51 of friction stabilizer 50, interior to ring flange 53 which is proximal end 55, with sufficient force to permit repeat testing with tension loads. The testing load force depends on the length and diameter of the friction stabilizer tube and the rock composition. For example, a 4 foot (1219 mm) friction stabilizer of 1.3 inches (33 mm) in diameter driven into a hard rock mining roof, typically tests at a three-thousand pound (3000 lb, 1,360 Kg) load which is seventy-five percent (75%) of the friction stabilizer design load carrying capacity.

Figure 5:
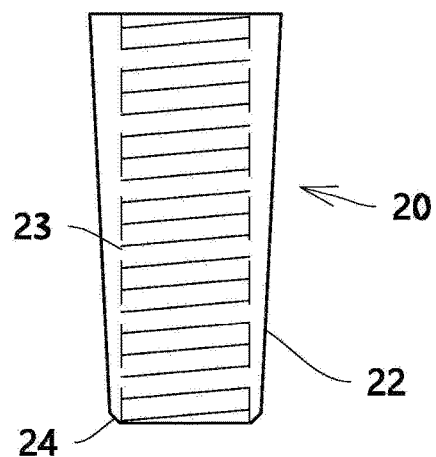
FIG. 5 shows a plane view of a preferred wedge plug.
Figure 7:
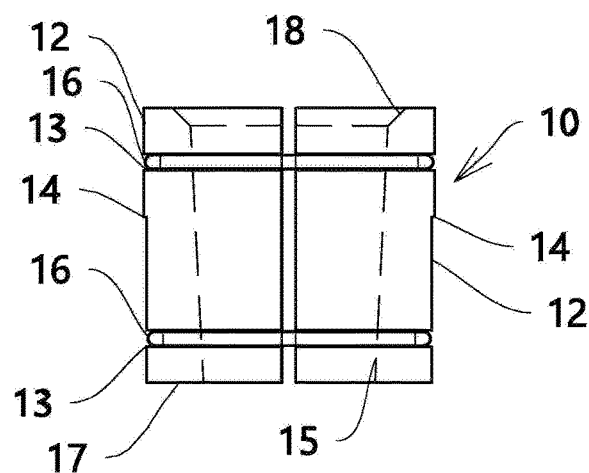
FIG. 7 shows a plane view of a preferred internal collet.
Figure 9:
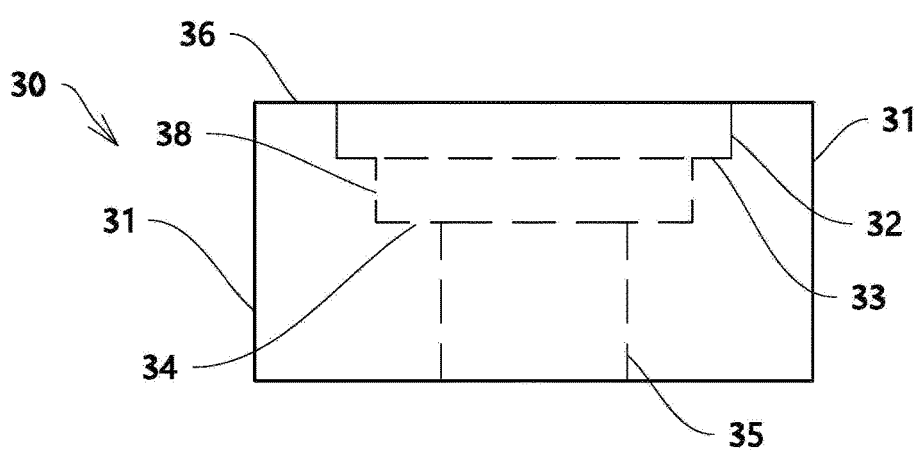
FIG. 9 shows a plane view of a preferred external collar.
Figure 6:
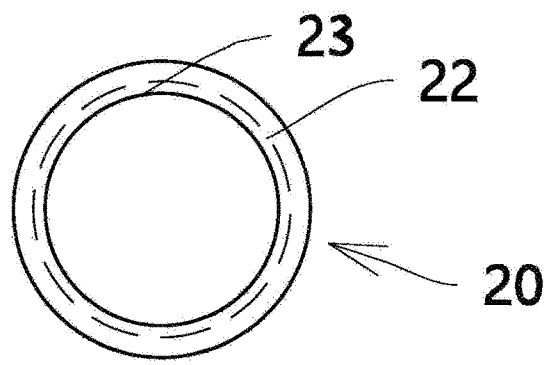
FIG. 6 shows a top view of the wedge plug.
Figure 8:
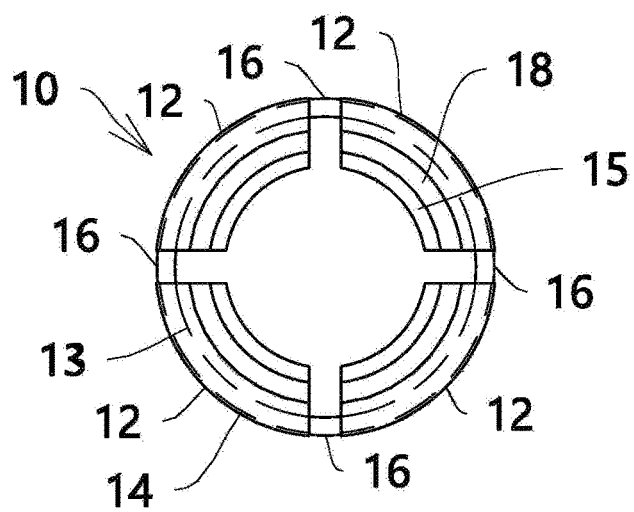
FIG. 8 shows a top view of the internal collet.
Figure 10:
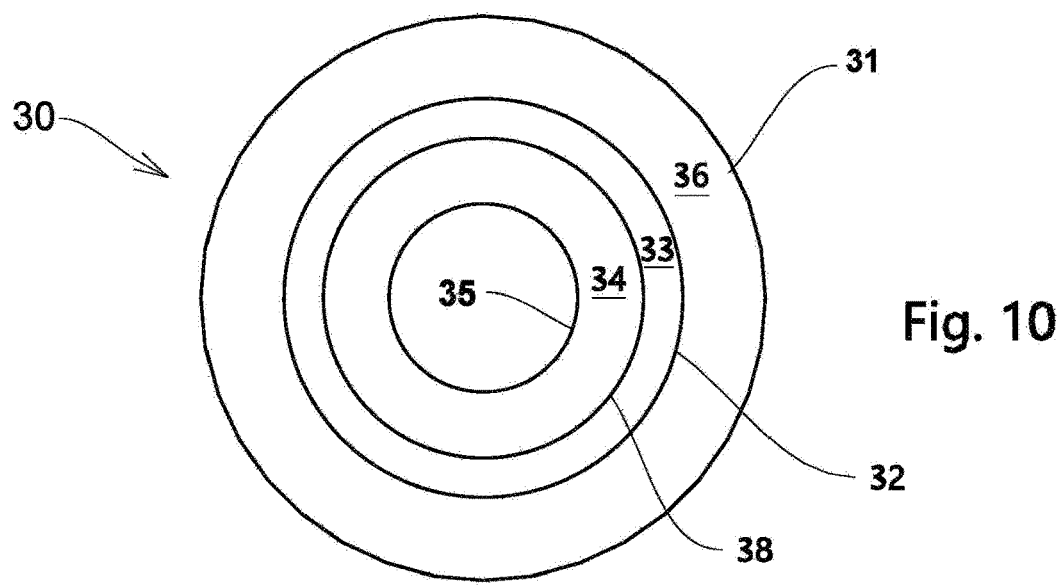
FIG. 10 shows a top view of the external collar.

Pull tester toolhead 200 is specially designed to repeatedly withstand these forces as various friction stabilizers are tested throughout a mine or tunnel. In use, the pull tester toolhead 200 expanding internal collet 10 is expanded by wedge plug 20. As shown in FIG. 2 of a preferred embodiment, expanding collet 10 is generally cylindrical and segmented, forming collet segments 12 (four shown) retained in cylindrical orientation with flexible o-rings 16 disposed in respective collet channels 13. While two or more collet segments would work, a preferred collet has three segments (not shown). Wedge plug 20 is fixed on tension rod 6, generally by threads 23, and has a tapered surface 22 with initial starting taper 24 shown in FIG. 5. Collet 10 has an initial starting tapered surface 18 and tapered surface 15 shown in FIG. 7. Wedge plug 20 is drawn down into collet 10 and tapered surfaces 15 and 18 cause collet 10 to expand outward against an interior surface 54 of friction stabilizer tube 51.

Pull tester toolhead 200 further includes a confining collar 30, as shown in FIGS. 1-2, 4, 9-10. Confining collar 30 is preferably steel and specially designed to slide freely on tension rod 6 via thru hole 35, restrain internal expanding device 10 to a desired location in split tube 51, and restrain friction stabilizer 50 from undesirable radially outward expansion, such that, friction stabilizer 50 is basically gripped or pinched between expanding collet 10 and collar 30. Confining collar 30 can withstand radial forces in excess of 75 tons (60,000 Kg) and its exterior surface 31 is sized to fit within a stand-off device 70.

Confining collar 30 uniquely includes a longitudinal confining surface 32 in a first recessed step (32, 33) from top surface 36. Confining surface 32 engages ring flange 53

(FIGS. 1, 4) and thus prevents radial outward expansion of ring flange 53. Restraining outward expansion of tube 51 at ring flange 53 improves the expanding collet 10 grip or pinch of tube 51 and prevents false frictional load capacity measurements due to interference and radial forces on faceplate orifice 63 or rock borehole 8. The first recessed step in confining collar 30 also includes a horizontal surface 33 that abuts a longitudinal proximal end side of ring flange 53 which prevents collar 30 from misaligning with respect to the ring flange and ensures a generally 360 degree confinement of the ring flange. Seating confining collar 30 against ring flange 53 at surface 33 is useful for pretensioning the pull tester toolhead 200 and serves to properly locate a second recessed step (34, 38).

Recessed surface 34 of second recessed step (34, 38) is horizontal and abuts end 17 of collet 10. In this way, collet 10 is uniquely restrained from moving longitudinally, either too deeply or too shallow into friction stabilizer tube 51, preferably locating a central area of collet 10 on interior surface 54 that is central to ring flange 53. The depth of indented recession surface 34 is sized so as not to contact frictional stabilizer tube proximal end 55 because the length of tube 51 between ring flange 53 and proximal end 55 varies and thus may alter the desired placement of interior collet 10. Surface 38 is similarly sufficiently spaced from tube 51 so as not to interfere with tube 51 during pull testing.

The depth of indented recession surface 34 also locates a step 14 on exterior surface of collet 10 near ring flange 53 of friction stabilizer 50. Step 14 on the exterior surface of collet 10 is shown as a diameter change of collet 10, of about 0.025 inches (0.64 mm), and is used to grip an interior surface 54 of split tube 51. In use, step 14 may create a minor swage 58 in tube 51 further increasing the pull tester toolhead gripping force on tube 51. Alternatively, exterior surface of collet 10 may have ridges such as threads, e.g. 1.25 inch all-thread (not shown), for gaining purchase on interior surface 54.

Pull tester toolhead 200 further includes a fastening device 4a-b for pre-tensioning or pre-loading the pull tester toolhead on a friction stabilizer while remaining testing equipment is installed. Fastening device 4a-b, can be a nut 4a and stiff compression spring 4b, where tightening nut 4a along tension rod 6 compresses spring 4b against a collar 30 surface opposite top surface 36 causing collar 30 to stay seated to ring flange 53 and wedge plug 20 to draw into collet 10 expanding collet 10 against interior surface 54. Fastening device 4a-b also retains confining collar 30 and collet 10 on tension rod 6 when not in use. Tension rod 6 is all-thread in one preferred embodiment, but could be a more durable threaded bar, a combination thereof, or the like. For example, tension rod 6 in another preferred embodiment may have two thread pitches, such as, all thread near the internal collet 10 and coarser thread near additional fastener 5 (represented in FIG. 1 only). In a preferred embodiment, the coarser threads are DYWIDAG(R) threads. The coarser threads provided for durability, and speed in attaching pulling apparatus 80. Tension rod 6 and fastening device 4a-b comprise a tension device for pre-tensioning and ultimately load testing the pull tester apparatus.

After pull tester toolhead 200 is pre-tensioned to a frictional stabilizer, stand-off device 70 and a pulling apparatus 80 are placed over tension rod 6. Additional fastener 5 is fitted to tension rod 6 for retaining stand-off device 70 and pulling apparatus 80 on tension rod 6. Pulling apparatus 80 is shown in FIG. 1 as a hydraulic pulling apparatus, but could another type of puller that incorporates a spring scale. Here, pulling apparatus 80 has a cylinder 81 and piston 82 and is connected to fluid pressure pump 85 and measuring device or pressure gauge 84 via hydraulic hose 83. Piston 82 displaces tension rod 6 in a longitudinal direction F away from collet 10 and friction stabilizer 50 thereby mimicking a load force on friction stabilizer 50, this tests the friction stabilizer 50 load bearing capacity. Here, measuring device 84 measures testing pressure which is converted to load capacity and compared to a predetermined load bearing capacity.

Figures 11, 12:
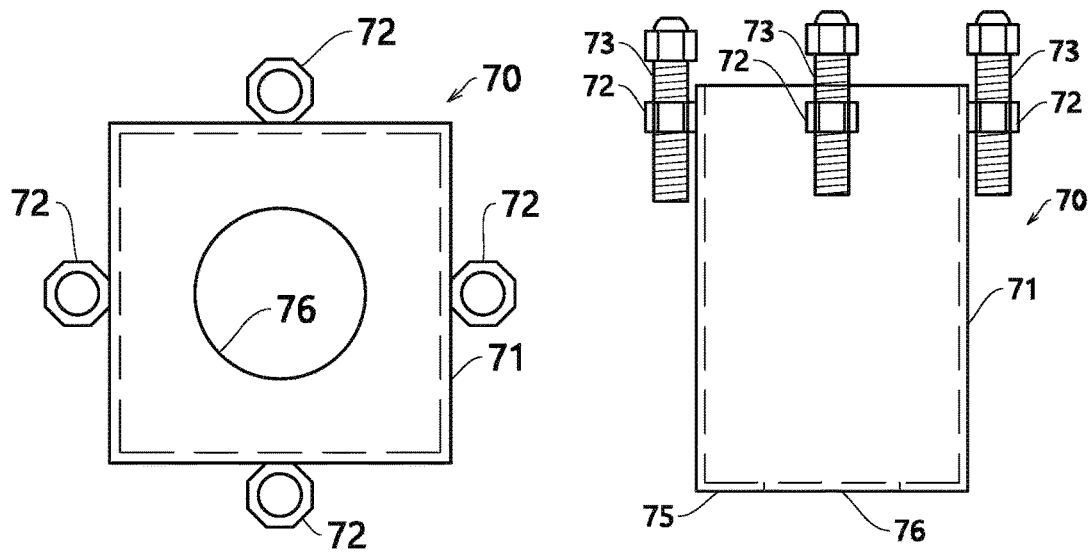
FIG. 11 shows a plane view of a preferred stand-off device.
FIG. 12 show a bottom view of the stand-off device.

FIGS. 1, 11 and 12 show a stand-off device 70 that provides an opposite force on friction stabilizer faceplate 60. Stand-off device 70 is shown as a square tube 71 having flanges 72 and base plate 75. Flanges 72 support adjustable legs 73 which engage faceplate 60 at surface 61 in each of the faceplate's four corners (not labeled). In practice, stand-off adjustable legs 73 may be bolts 73 threaded through flange nuts 72 to appropriate lengths. By engaging faceplate 60 with stand-off device 70, a solid surface carries the opposing load force from pulling apparatus 80. Engaging solid surface 61 of faceplate 60 is preferred over trusting surrounding rock surface 9a to carry this force, however where interference between tube 51 and faceplate orifice 63 is of concern, the stand-off device may be placed against a surface outside of faceplate 60.

Figure 4:
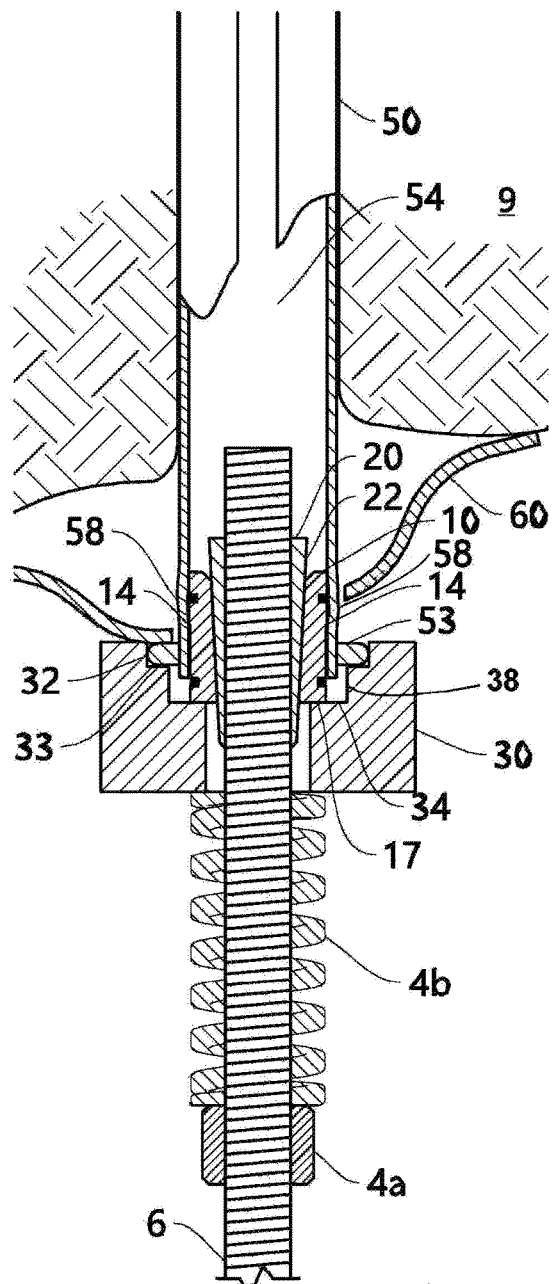
FIG. 4 shows a close-up partial cross-sectional view of the preferred friction stabilizer pull tester toolhead inserted into a friction stabilizer of FIG. 1.

Once friction stabilizer pull tester apparatus 100 is assembled on friction stabilizer 50, 60, pulling apparatus 80 is activated. Hydraulic pump 85 increases pressure in cylinder 81 causing piston 82 to pull tension rod 6 longitudinally in force direction F. Force direction F is longitudinal and axial with respect to friction stabilizer tube 51. Continued pulling causes wedge plug 20 to further expand collet 10, causing step 14 to swage tube 51 at swage region 58, thereby increasing the collet's gripping ability on tube 51, as shown in FIGS. 1, 4. Swage region 58 proximate, that is at or near, ring flange 53 has been found by the inventor to not to produce false load readings due to it's location and relatively small distortion compared to faceplate orifice 63. Again, internal radial force on friction stabilizer tube 51 is counter-intuitive because tube 51 is biased radially outward during manufacturing so applying radial force would seemingly cause more frictional contact between tube 51 and borehole 8, or cause radial deformation that would seemingly interfere with faceplate 60. Confining collar 30 prevents undesirable deformation of tube 51 by restraining ring flange 53 against its surface 32, and confining surface 34 retains collet 10 in a preferred location inside tube 51 while wedge plug 20 is drawn longitudinally toward pulling apparatus 80. In this way, forces are localized near proximal end 55 of friction stabilizer tube 51 enabling a true pulling force test of a friction stabilizers load capacity.

For a Split Set® friction stabilizer of SS-33 designation, a 1.3 inch (33 mm) diameter tube 51, that is 4 feet (1219 mm) long, a pull tester toolhead 200 internal expanding collet 10 is provided that is 1.25 inches (32 mm) long and has a 0.025 inch (0.64 mm) step, located 0.75 inches (19 mm) from end 17, and an internal taper of 7.6 degrees mating with a similar but complementary taper of wedge plug 20. Wedge plug 20 being 2 inches (51 mm) long, 1 inch (25 mm) in diameter at its larger end and having a $\frac{5}{8}^{th}$ inch (15.9 mm) tapped bore for receiving an all-thread type tension rod 6. Confining collar 30 has a 3 inch (76 mm) outside diameter, 1.5 inches (38 mm) high and has a first shallow indented recession or first step (32, 33) shown as an indented ring 2.1 inches (53 mm) in diameter and 0.26 inches (7 mm) deep, second deeper indented recession or second step (34, 38) shown as a recessed ring 1.7 inches (43 mm) in diameter and 0.65 inches (17 mm) deep. In addition, confining collar 30 has a cylindrical thru hole 0.75 inch (19 mm) in diameter.

Split Set® friction stabilizer are manufactured in a variety of sizes, for example a Model SS-39 is 1.5 inches (39 mm) in diameter, and a Model SS-46 is 1.8 inches (46 mm) in diameter. The pull tester toolhead wedge plug, internal collet and confining collar can be resized accordingly. For example, confining collar 30 first shallow indented recession (32, 33) may have a resized diameter 0.01 to 0.015 inches (0.254 to 0.381 mm) larger than the outside diameter of ring flange 53. Similarly, the second deeper indented ring (34, 38) may have a resized diameter 0.00 to 0.02 inches (0.0 to 0.5 mm) smaller than the inside diameter of ring flange 53. Collet 10 diameter is sufficiently smaller in collapsed state to easily slip inside the tube of the appropriately sized friction stabilizer, but not so small as to fail to fully engage inside surface 54, well before wedge plug 20 can slip out of collet 10. Collet 10 length may vary by as much as 0.5 inches (13 mm), so long as the fully engaged outside surface of collet 10 is exerting radial force on and slightly above the friction stabilizer ring flange 53, and is long enough to hold that position when toolhead 200 is pulled with a testing force. Wedge pug 20 taper of 7.6 degrees may vary plus or minus 3 degrees to provide optimum distribution of forces, e.g., wedge plug 20 and or collet 10 may have longer steeper tapers for a larger diameter friction stabilizer 50.

Figure 13:
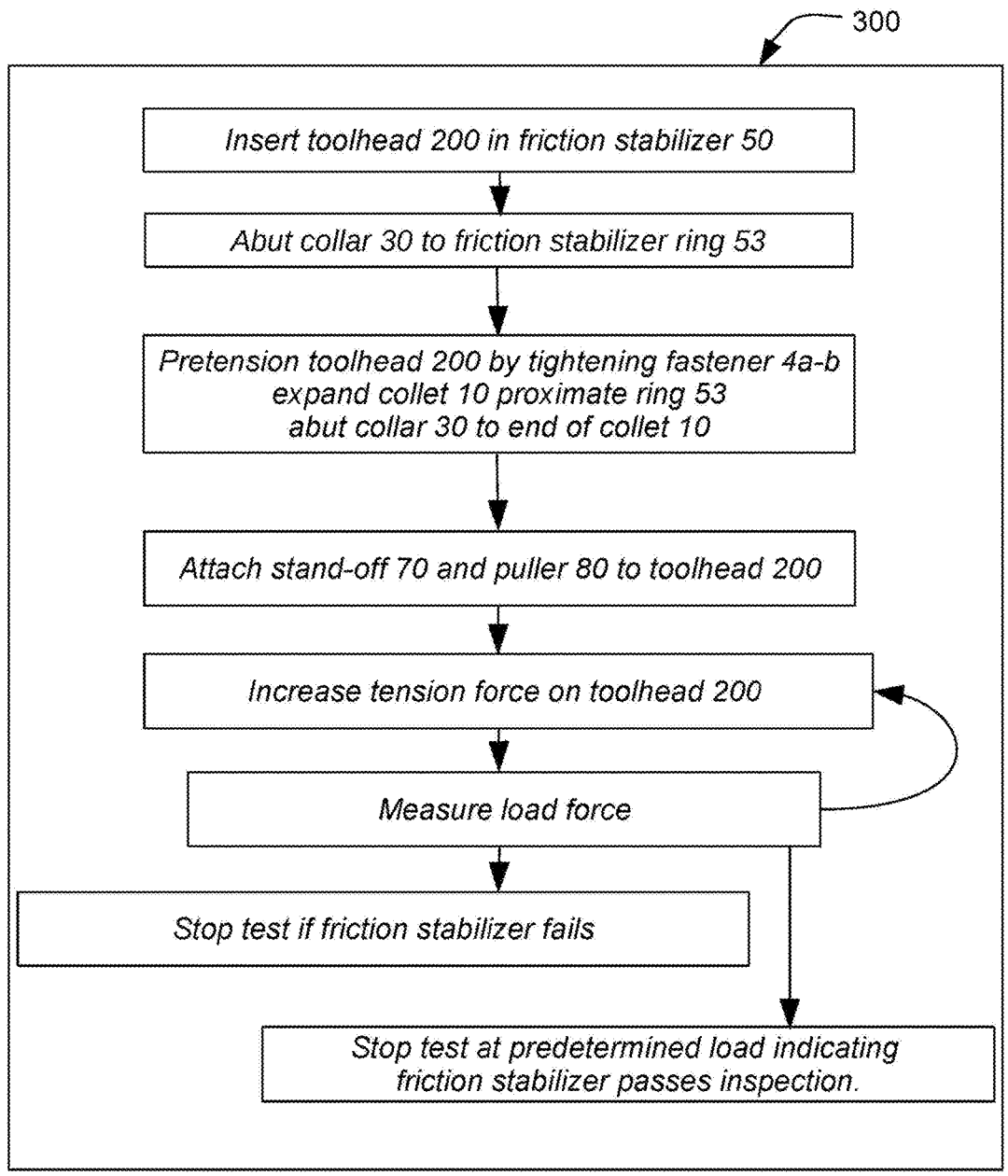
FIG. 13 shows a flow chart of a preferred method of using the preferred friction stabilizer pull tester apparatus.

FIG. 13 is a method flow chart 300 for pull testing a friction stabilizer 50, including inserting an expanding collet 10 into a friction stabilizer tube 51, abutting a confining collar 30 to ring flange 53, pre-tensioning toolhead 200 expanding collet 10 tight against interior surface 54 of the friction stabilizer tube 51, abutting collet end 17 against confining collar 30 which properly locates collet 10 in tube 51 and confines collet 10 from longitudinal movement. The method further including attaching a stand-off 70 and pulling apparatus 80 to toolhead 200, increasing tension force on toolhead 200 with a pump 85, for example, and measuring the applied load, stopping the test if the friction stabilizer fails or continued tensioning until a predetermined load has been applied at which point the friction stabilizer has passed nondestructive testing and is deemed safe.

More broadly, the method of testing the load capacity of an installed friction stabilizer type rock bolt includes exerting a longitudinal force F which is transferred to exerting a radially outward force inside the friction stabilizer elongate tube 51 proximate a proximal end 55, and a tension force to elongate tube 51, and measuring the tension force exerted to determining the load capacity of the friction stabilizer. The method further including confining radial displacement of the friction stabilizer elongate tube 51 near the proximal end 55 to counteract said radially outward force, confining longitudinal movement of an internal collet exerting the radial outward force.

More specifically, the method of testing further includes providing a pull tester toolhead 200 comprising a tension rod 6, a collet 10 which may swage or grip the friction stabilizer, a wedge plug 20 and a confining collar 30. Pre-tensioning the pull tester toolhead 200 on a friction stabilizer 50 by tightening a pre-tension device 4*a*-*b*. Further, pulling tension rod 6 with a pulling apparatus 80 and providing a stand-off device 70 that transfers an equal but opposite force onto friction stabilizer faceplate 60. And, measuring a load force F on pressure gauge 84 to determine the load capacity of friction stabilizer 50. If a predetermined load force is met, then the friction stabilizer is secure and the friction stabilizer passes inspection; this load force is typically seventy-five percent (75%) of its specified load capacity. If the friction stabilizer fails, such as by slipping in borehole 8 prior the predetermined load force, then the friction stabilizer fails to pass inspection.

In the preferred method, the pull tester toolhead includes a tension rod, an internal collet, and an external collar, and where said friction stabilizer has a ring flange adjacent its proximal end. Here, the external collar abuts against said friction stabilizer ring flange radially and longitudinally and against an end of the internal collet when exerting a tension force to the tension rod which also seats the internal collet against an interior surface of the elongate tube confined by the ring flange. When the internal collet has a step, tension force on the tension rod may swage the elongate tube proximate the ring flange.

The specification and drawings have set forth a best mode of the invention, with features and objects of the apparatus and device. It should be understood that, within the scope of the claims, the invention may be practiced other than specifically disclosed in the illustrations, description and claims.

I claim:

1. A pull tester toolhead apparatus for load testing a friction stabilizer, the friction stabilizer having an elongate tube that is frictionally anchored; the pull tester toolhead apparatus comprising:
    an expanding device sized to expand inside the friction stabilizer elongate tube and seat against the friction stabilizer elongate tube proximate one end thereof; and,
    a confining device sized to abut an exterior of the friction stabilizer proximate said one end so as to substantially limit radial displacement of the friction stabilizer elongate tube; and,
    a tension rod extending through the confining device to the expanding device, the tension rod capable of withstanding a load testing tension force; and wherein,
    the expanding device and the confining device are sized to pinch the friction stabilizer there-between with a force sufficient to prevent longitudinal slippage of the pull tester toolhead apparatus from the friction stabilizer as a load testing tension force is applied to the tension rod in a longitudinal direction generally axial to friction stabilizer elongate tube.

2. The pull tester toolhead apparatus of claim 1, wherein the friction stabilizer has a ring flange proximate the one end of the friction stabilizer elongate tube; and,
    the confining device abuts the expanding device and is sized to seat the expanding device proximate the ring flange; and,
    the confining device having a step sized to abut the ring flange in a radial direction and in a longitudinal direction generally parallel to the friction stabilizer elongate tube.

3. The pull tester toolhead apparatus of claim 1, wherein the friction stabilizer has a ring flange proximate the one end of the friction stabilizer elongate tube; and wherein, the tension rod slides freely through the confining device such that the expanding device will remain seated proximate the ring flange and the confining device will remain abutted radially to the ring flange while the load testing force is applied to the tension rod.

4. The pull tester toolhead apparatus of claim 3, further comprising;
    a pre-tensioning device including a compression spring and a fastening device each on the tension rod, the compression spring capable of forcing the confining device against the ring flange in a longitudinal direction, and the fastening device holding the compression spring in position.

5. The pull tester toolhead apparatus of claim 1, further comprising;
   a wedge plug having a tapered surface at one end of the tension rod; and,
   the expanding device comprises a collet having at least two segments and a complementary tapered surface that mates with the wedge plug tapered surface, wherein the expanding device expands radially outward as the wedge plug is drawn into the collet.

6. The pull tester toolhead apparatus of claim 5, wherein the wedge plug tapered surface is about 7.6 degrees plus or minus 3 degrees, and the expanding device has an opposing tapered surface of, about 7.6 degrees plus or minus 3 degrees.

7. The pull tester toolhead apparatus of claim 1, wherein the friction stabilizer has a ring flange proximate the one end of the friction stabilizer elongate tube; and
   wherein:
   the confining device includes a collar having two internal steps, a first internal step sized to abut the ring flange radially and longitudinally, and a second internal step sized to abut one end of the collet.

8. The pull tester toolhead apparatus of claim 7, wherein the collar is generally cylindrical with a thru hole extending longitudinally therethrough, and the first and second internal steps being concentric circles of different depths centered around the thru hole, the second internal step of smaller diameter than the first internal step and the second internal step of sufficient depth and radial length to provide a clearance fit to an exposed end of the friction stabilizer elongate tube.

9. The pull tester toolhead apparatus of claim 1, wherein the friction stabilizer has a ring flange proximate the one end of the friction stabilizer elongate tube;
   wherein:
   the confining device includes a collar having two internal steps, a first internal step sized to abut the ring flange radially, and a second internal step abutting one end of the expanding device, the first internal step having a diameter 0.01 to 0.015 inches larger than an outside diameter of the ring flange, and the second step having diameter 0.0 to 0.02 inches smaller than an inside diameter of the ring flange.

10. The pull tester toolhead apparatus claim 1, wherein the friction stabilizer has a ring flange proximate the one end of the friction stabilizer elongate tube; and
    wherein:
    the expanding device has a bite portion for gripping an inside surface of the friction stabilizer elongate tube proximate the ring flange; and,
    the confining device is shaped to confine radial displacement of the ring flange generally 360 degrees around the ring flange.

11. A method of testing the load capacity of a friction stabilizer having an elongate tube using the pull tester toolhead apparatus of claim 1; the method comprising:
    providing the pull tester toolhead apparatus of claim 1;
    exerting a tension force longitudinal to said friction stabilizer elongate tube;
    exerting a radially outward force inside the friction stabilizer near the one end of the friction stabilizer elongate tube;
    measuring the tension force to determining the load capacity of the friction stabilizer.

12. The method of claim 11, further comprising;
    confining radial displacement of the one end of the friction stabilizer elongate tube with the confining device to counteract the radially outward force.

13. The method of claim 12, wherein the friction stabilizer elongate tube has a ring flange adjacent the one end; the method further comprising:
    locating the radially outward force proximal the ring flange; and wherein; confining the radial displacement of the one end of the friction stabilizer elongate tube includes abutting the confining device to the ring flange longitudinally and radially.

14. The method of claim 11, wherein the expanding device includes an internal collet, and the confining device includes an external collar; further comprising:
    inserting the expanding device in the friction stabilizer elongate tube;
    exerting a pre-tensioning force longitudinal to the friction stabilizer elongate tube to seat the expanding device against an interior surface of the friction stabilizer elongate tube;
    confining radial displacement of the friction stabilizer by abutting the external collar against the friction stabilizer and against an end of said internal collet; and
    increasing the tension force to a load testing force.

15. A pull tester toolhead apparatus for load testing an installed friction stabilizer elongate tube, the friction stabilizer elongate tube frictionally anchored; comprising:
    a tension device including a tension rod and a pre-tensioning device, the pre-tensioning device on the tension rod and for applying an initial tension force on the tension rod;
    an expanding device including a generally cylindrical collet that expands upon application of the initial tension force, the expanding device on the tension rod and sized to expand inside the friction stabilizer elongate tube and seat generally proximate one end thereof; and,
    a confining device including a collar, the confining device on the tension rod and sized to substantially limit radial movement of the friction stabilizer elongate tube generally opposite the expanding device as a load testing force is applied axially to the tension rod.

16. The pull tester toolhead apparatus of claim 15, wherein the friction stabilizer elongate tube has a ring flange near an exposed end; and wherein,
    the pull tester toolhead apparatus includes a wedge affixed to one end of the tension rod, and wherein the collet expands as the tension rod draws the wedge into the collet, and wherein the confining device collar is sized to abut the ring flange in a radial direction such that the collet pushes radially outward proximate the ring flange and the confining collar restrains the ring flange.

17. The pull tester toolhead apparatus of claim 15, wherein the confining collar slides along the tension rod between the expanding device and the pre-tensioning device, and the confining device collar having a first step sized to abut the ring flange in a longitudinal direction approximately parallel to the friction stabilizer elongate tube.

18. The pull tester toolhead apparatus of claim 15, wherein the confining device collar abuts an end of the collet so as to locate the collet proximate the ring flange; and the tension rod having a first thread pitch for the pre-tension device and a second coarser thread pitch.

19. The pull tester toolhead apparatus of claim 15, wherein the pre-tensioning device includes a compression spring and a fastener that move along the tension rod to compress the confining device longitudinally against friction stabilizer and initially expand the collet inside the friction stabilizer elongate tube, the confining collar being located between the pre-tensioning device and the collet.

20. A method of measuring the load capacity of an installed friction stabilizer having an elongate tube and an external ring flange proximate one end, the friction stabilizer elongate tube being frictionally anchored; comprising:

providing a pull tester device having an internal expanding device, an external confining device, a tension rod, and a pre-tensioning device;

inserting the internal expanding device in the elongate tube;

pre-tensioning the tension rod with the pre-tensioning device to seat the expanding device in the elongate tube, the pre-tensioning device pressing the external confining device longitudinally against the ring flange, the confining device having two internal steps, a first step abutting the ring flange radially and longitudinally, and a second step having a clearance fit with the friction stabilizer;

pulling the tension rod with a testing force; and measuring the testing force applied to the tension rod.

* * * * *